Feb. 9, 1937. J. B. CRANE 2,070,115
FLUID BEARING
Filed Nov. 1, 1934 2 Sheets-Sheet 1
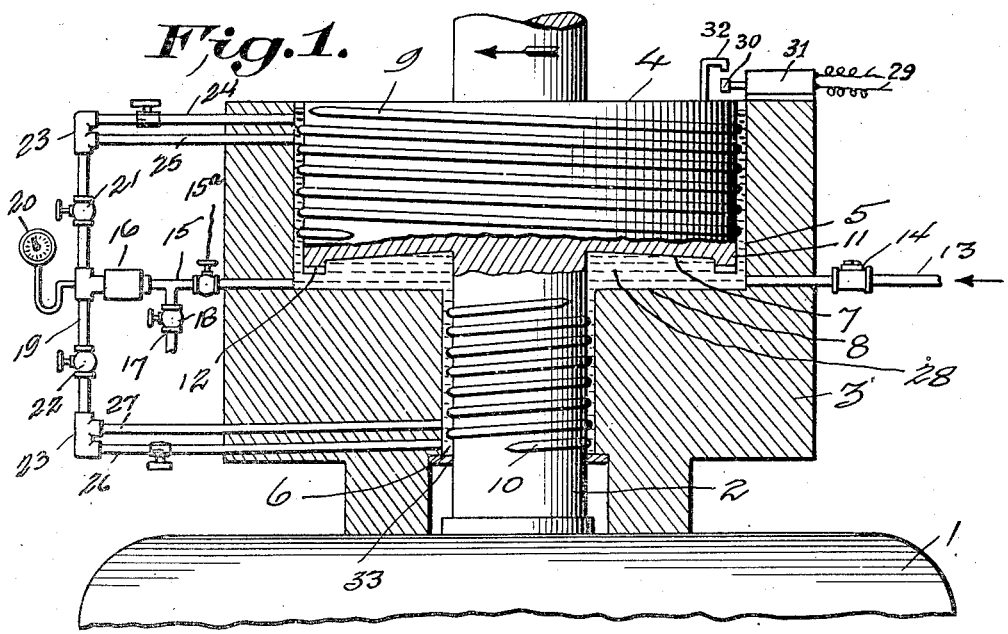
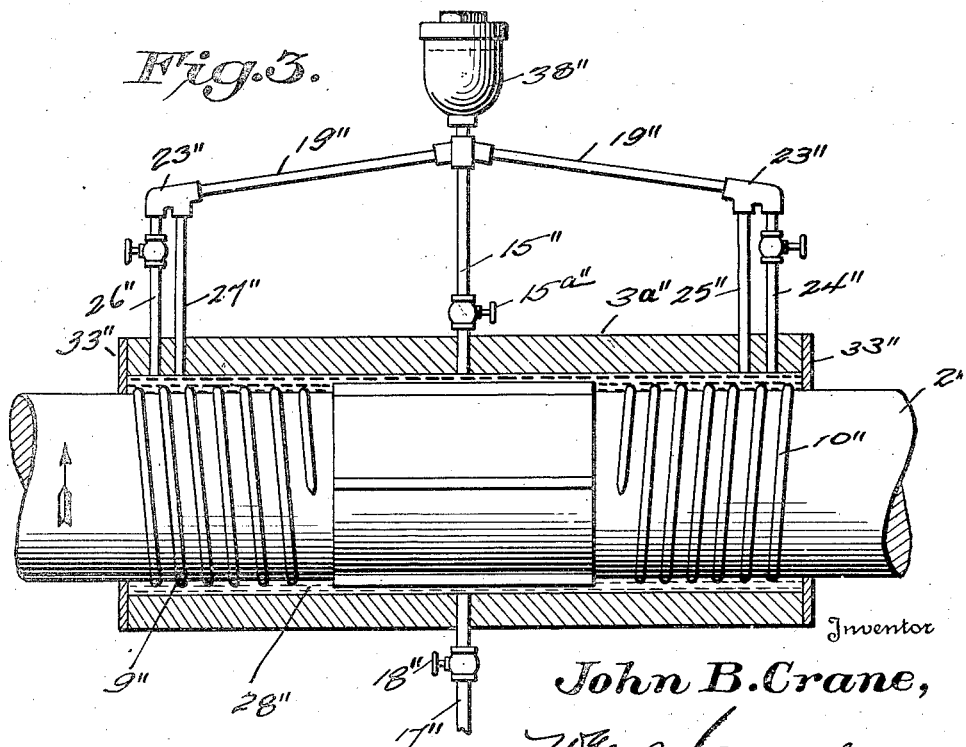

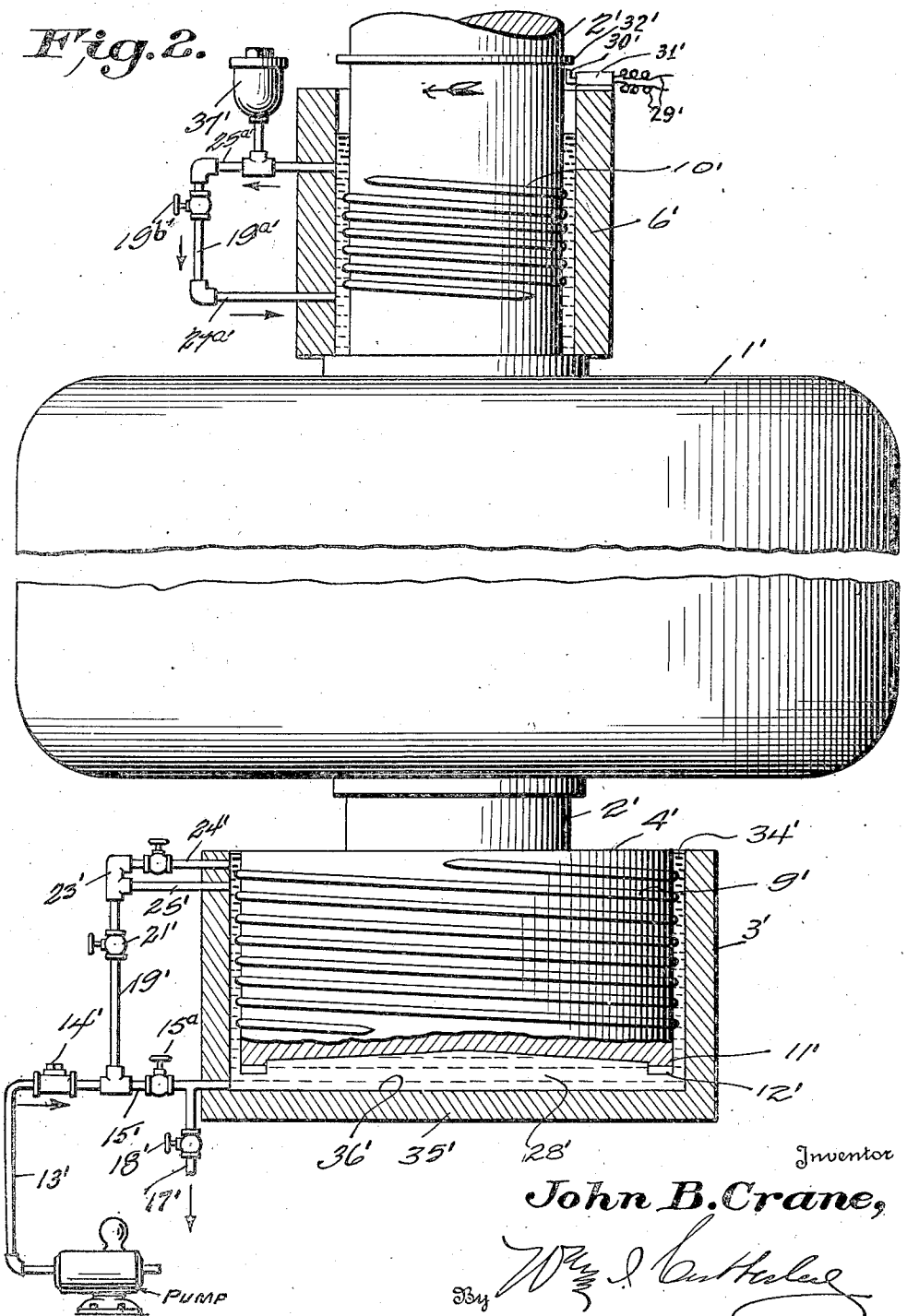

Patented Feb. 9, 1937

2,070,115

UNITED STATES PATENT OFFICE 2,070,115

FLUID BEARING

John Beatty Crane, Aberdeen, Wash.

Application November 1, 1934, Serial No. 751,050

6 Claims. (Cl. 308—9)

My present invention, in its broad aspect, has to do with improvements in bearings of the type wherein the moving parts are subjected to a minimum frictional coefficient, by reason of the fact that all bearing surfaces operate upon fluid or oil cushions as distinguished from oil films, and wherein the pressure of the oil cushion is built up to a predetermined point as speed of operation increases and there sustained automatically. In its present application my invention is shown as functioning as an anti-frictional fluid suspension of a complete generator unit, but it is to be understood that the broad inventive concept underlying the present detailed disclosure is capable of wide application in a variety of specific forms.

In order to more clearly define the advantages and unique structural details of my bearing, it may be here briefly stated that it contemplates generally the provision of relatively extensive spacing between opposed bearing surfaces; the cavities thus formed constituting oil or fluid chambers; and the provision of an automatically controlled pumping system in a closed unit of oil or fluid distribution associated with the oil chambers whereby pressure is built up within the system and chambers sufficient to support the weight of the moving parts so that there is a fluid suspension of such parts with the bearing surfaces operating wholly upon the oil contents of the chambers thereby accomplishing complete fluid suspension with the result that frictional losses are reduced to a minimum. A unique and necessary feature of my invention is the provision of screw or worm devices on the moving parts per se for directing the flow of lubricant and building up pressure at the points where frictional losses would ordinarily be the greatest and where fluid suspension of the parts is centered. In operation and construction my invention is very simple and wholly automatic, and there are no parts which require minute adjustment or which are so fragile as to necessitate careful handling or frequent repairs. Furthermore, means are provided for renewing oil contents or flushing the bearing, and for relieving excess pressure, and there are no internal intricate parts which will necessitate tearing down the bearing from time to time to make replacements or for repairs or adjustments. As heretofore stated my bearing is self-sustained and wholly automatic and is applicable to various loads—both large and small—and to various types, shapes and forms of machines or parts requiring anti-frictional treatment.

In the drawings wherein is illustrated a preferred form and several modifications of my invention;—

Figure 1 is a vertical section of a bearing and suspension unit for a generator the moving parts of which are wholly suspended from the top;

Figure 2 is a vertical section of a bearing and suspension unit for a generator which is fluid supported from the bottom, and Figure 3 is a section of a bearing and suspension unit for a horizontal shaft.

In the drawings wherein like characters of reference are used to designate like or similar parts throughout the several views;—

The numeral (1) designates conventionally a generator of a well known type rotating on a vertical axis and having the usual shaft (2). There is a bearing block (3) about the shaft (2) of a size and type sufficient to support the weight and load of the generator. There is a collar either formed integrally with the shaft (2) or shrunk on the shaft or otherwise attached to it in any suitable manner; this collar is designated (4) and is received in the larger of two communicating bores (5) and (6) in the bearing block so that the under bearing surface (7) of the collar is opposed to the upper bearing surface (8) of the block. If desirable the collar (4) may be made of suitable aluminum alloy to avoid excess weight; or it can be fashioned like a drum or the like. The peripheral surface of the shaft (2) received in the bore (6) is spirally grooved, and so also is the peripheral surface of the collar (4), but the directions of the spiral grooves are opposite; and each has received therein a spiral spring or split spring, respectively (9) and (10), so that when the generator is rotated the springs feed respectively up with respect to spring (10) and down with respect to spring (9). It is to be understood that the spaces between the bores (5) and (6) and bearing surfaces (7) and (8) are exaggerated in the drawings to more clearly illustrate the parts and operation of my invention. The under face of collar (4), or bearing surface (7) is concave or slanted upwardly toward the shaft (2) as shown in Figure 1, and the outer edge is provided with an annular lip (11) formed with a series of oil channels (12) the purpose of which will hereafter appear.

Leading into the bore (5) is an oil supply pipe (13) having a check valve (14) and receiving its supply from a pump (not shown), and on the opposite side of the bearing block are a series of pipes constituting a closed system of fluid distribution having an intake pipe (15) provided with a valve (15a) and a filter (16) and a valved drain pipe (17) and a valve (18), and leading into a vertical pipe (19) carrying a pressure gauge (20) and a valve (21) above the gauge and another valve (22) below the gauge. At the ends of pipe (19) are two-outlet fittings (23) respectively connecting the two upper return pipes (24) and (25) and the two lower return pipes (26) and (27) with the pipe (19) from the bores (5) and (6) respectively. Pipes (24 and (26) have throttle valves therein the purpose of which will appear.

The foregoing parts refer especially to Figure 1, and the operation is as follows:—Assuming that all oil spaces are filled including pipes (15), (13), (19), (24), (25), (26), and (27). In this condition the annular lip (11) is resting upon the upper bearing surface (8) supporting the entire weight of the generator (1) from the block (3). The generator, which may be a turbine generator, is now put in motion by opening the water gate thereto, in which case the oil pump (not shown) and which is operatively connected in any suitable manner with the generator through an electrical circuit, is set in operation, thereby pumping oil into the bearing and building up pressure between the opposed bearing surfaces (7) and (8) forming a cushion (28) and as the oil pressure per square inch increases to a point where it overcomes the weight of the rotating unit represented by the generator, the generator unit will rise to increase the oil space and dispose the parts in the position shown in Figure 1; and since the respective spiral springs (9) and 10) are opposed to each other with respect to their action the oil in the spaces about the peripheral surfaces of the shaft (2) and collar (4) will be urged toward the cushion (28) and circulation of oil will be set up in pipes (15), (19), (24), (26) and (27). At this point in the operation the entire generator unit is supported on the oil cushion (28) and friction is reduced to a minimum; at the predetermined point of built up pressure and consequent rise of the generator unit and shaft (2) the relay in the pump circuit, designated (29), will be brought in operation. This relay is so constructed that its windings are too weak to pull up the relay bar (30) of the armature (31) on account of the weight of the relay bar. Said bar has its windings so arranged that its outer end is a solenoid magnet. The outer or solenoid end of the bar is in the path of the contact arm (32), and before the generator unit started to rise the contact points on bar (30) and arm (32) were so close that they had "seized" as a stud will on a relay assembly to prevent direct contact. In this position the circuit is closed and the electromagnet is energized, closing the circuit to the pump; but when the generator unit reaches the desired height the space between the relay bar (30) and arm (32) is widened to the point where the bar is "unseized" and permitted to drop of its own weight, thereby opening the switch (not shown) and putting the pump out of operation, in which case no more oil is pumped into the system. The system is now in substantial equilibrium, with oil being circulated out of pipe (15) and into the vertical pipe (19) and back through pipes (24), (25), (26), and (27). The oil from pipe (24) is discharged against the outer circumference or peripheral surface of the collar (4) to lubricate that part of the bearing which would not receive a supply of oil at this time; the throttle valve should be only slightly open. The pipe (25) on the other hand is open and discharges its contents at a point (first turn) where it will be taken up by the spiral member (9) and urged down toward the cushion (28). The same sequence of operation applies to the oil in pipes (26) and (27), except that oil from pipe (27) is urged upwardly toward the cushion. Bearing surfaces should be as far apart as possible, and at the same time insure practical operation, since the advantages of my present invention reside rather in the provision of an oil cushion instead of the usual oil film. Bearing surfaces in my present assembly "slick" around upon an oil cushion or body, rather than operate on a film as in conventional assemblies.

Since oil pressure will be continuously built up by the action of the spiral members, adjustment of the flow is made through throttle valves (21) and (22) to permit pipes (25) and (27) to deliver oil as fast as the bearing will take it to maintain a balance. When it is desired to change oil, the drain pipe is opened and the system will quickly purge itself, replacement being affected through the pump and pipe (13): and to change the cartridge in oil filter (16) it is merely necessary to close valves (21) and (22) and valve (15a). The oil having been changed and the filter cartridge replaced, the valves are reset as originally described and the operation of the system resumed.

It may be pointed out here that the provision of an oil "cushion" as distinguished from an oil film, and the method of controlling automatically the input of oil, building up of pressure, and sustaining the pressure at a predetermined point, are the principal novel features of my invention; as well as the principle of supporting the rotating generator assembly on the oil cushion. The function of the pump is to raise the initial pressure and replace oil which may be lost or removed, and while the respective parts of the electrical circuit are admittedly old, the application of the pump and circuit to present use is believed to be distinctly novel. If desired oil seals may be used, as at (33).

In Figure 2, an arrangement is shown embodying my invention wherein the generator unit is supported at its base rather than suspended as in Figure 1. The shaft (2') at the under part of the generator (1') carries the collar (4') and the bearing block (3') has a cavity (34') with a closed base (35') the upper surface of which, designated (36') is the bearing surface opposed to the concave bearing surface of the collar (4'); when the generator is rotated the oil cushion (28') is built up under the collar (4') to raise the assembly. As to the upper part of the shaft (2') above the generator; supply of oil is replenished from oil cup (37') and is fed by gravity; the motor pump to deliver oil does so through pipe (13') as indicated by the arrow. In Figure 3 my invention is shown as applied to a horizontal shaft, with the oil supply being furnished from the cup (38'').

It will be noted in Figure 2 that circulation of oil with respect to the upper part of shaft (2') is through a closed system represented by a top pipe (25a') a vertical pipe (19a') with a valve (19b'), and a lower pipe (27a') circulation being in the direction of the arrows, and the supply having a gravity feed cup or reservoir (37'). In Figure 3, wherein the horizontal shaft system is shown, the gravity oil cup (38'') is located at the junction of pipes (19") and (15"); pressure in this system is maintained by the opposed spiral springs (9") and (10") and may be regulated by adjusting valve (15a").

From the foregoing it is believed that the operation and construction of my invention will be apparent. It is manifest that there is an oil suspension of operating parts and that opposed moving parts are separated rather by a cushion of oil than by a film; with the result that frictional losses are radically reduced and the life of all parts greatly increased, as well as maintaining increased smoothness of operation.

While I have described in the foregoing particular forms of my invention; it is manifest that changes in structure and disposition may be indicated to meet specific practical requirements without departing from the spirit of my invention; and the right to make such modifications is emphasized provided they fall within the scope of what is claimed.

I claim:—

1. A shaft bearing in combination, a shaft formed with a spiral groove extending a portion of its length, a spring metal spiral member seated in the groove and extending out to form a spiral ridge about the shaft, a bearing block about the shaft formed to provide an oil chamber in which the spiral member works, said shaft being mounted for slight axial movement with respect to the bearing block, a system of fluid distribution, a pump in said system, electrical control means for the pump, a protuberance on the shaft engaging an actuating member on the bearing to engage the electrical control to operate the same whereby initial pressure is built up in the chamber by the pump, to move the shaft to cushion the same on the body of oil under pressure in the chamber, and said spiral member operating to sustain said pressure and cause the oil to circulate in said system.

2. A shaft bearing in combination, a shaft formed with series of oppositely pitched spiral grooves in the surface thereof, spring metal spiral members seated in the grooves and extending out to form series of oppositely pitched spiral ridges about the shaft, a bearing block about the shaft on which the shaft is normally seated formed with an oil chamber in which the spiral members work, a system of fluid distribution, a pump in said system, control means for the pump, an actuating member on the shaft for the control means for the pump to operate the same whereby initial oil pressure is built up in the chamber by the pump, to move the shaft and cushion the same on the body of oil in the chamber, and said spiral members operating to maintain said oil pressure and to cause said oil to flow in the system of distribution.

3. A shaft bearing in combination, a shaft, a collar on the shaft, the under face of the collar being concave and having oil grooves in its peripheral edges, a bearing block about the collar and forming a chamber beneath the same, said collar normally seated on the bearing block said collar provided with a spiral groove in its surface, a spring metal spiral member seated in the groove and extending out to form a spiral ridge about the collar, a system of oil distribution leading to a point above the spiral ridge and to a point communicating with the chamber below the collar, a pump in said system, and means actuated by said shaft for controlling the operation of said pump to build up initial pressure in said chamber below the collar to lift the same from contact with the bearing block, and said spiral ridges operating to maintain said oil pressure to cause the oil to circulate in the system of distribution.

4. A shaft bearing in combination, a shaft, a collar on the shaft, the under face of the collar being concave and provided with oil grooves in its peripheral edges, said collar and shaft being movable and provided respectively with oppositely pitched series of spiral grooves, spring metal spiral members in said grooves forming oppositely pitched series of ridges, a bearing block about the shaft and collar and forming a chamber beneath the collar said collar normally seated on the bearing block, a system of oil distribution leading to the bearing block, and means on the shaft for building up oil pressure beneath the concave face of the collar to lift the collar from the bearing block, and said spiral ridges operating to preserve said pressure and cause the oil to circulate in the system of distribution.

5. A shaft bearing for generators in combination, shafts above and below the generator and supporting the same, bearings for the shafts, said generator and shafts being slightly movable axially with respect to the bearing block, the lower bearing having a closed base normally supporting the assembly of shafts and generator, a member carried on the lower shaft having a concave face opposed to the closed end of the bearing and oil channels in its edges, a system of fluid distribution leading to said bearings and to the space between the concave face and the closed end of the lower bearing, spiral means carried by said upper shaft, and spiral means having a pitch the same as the upper spiral means carried by the lower shaft means for building up initial pressure in the fluid between the concave face and the closed end of the lower bearing for spacing the generator and shaft assembly from the bearing block, and said spiral ridges operating to maintain said pressure and cause the oil to circulate in the system of distribution.

6. A shaft bearing for generators and the like, in combination, a shaft carrying the generator, a bearing block about the shaft and normally directly supporting the shaft, an enlarged collar on the shaft, said bearing block receiving the collar and having a face opposed to the under face of the collar to form a chamber, said under face of the collar being concave, means for building up initial pressure in the chamber to move the shaft and collar and generator to space the same from contact with the block, and spiral means having pitches opposed to each other, a closed system of fluid distribution, and the spiral means functioning to urge the fluid toward the chamber to sustain the oil pressure therein to cushion the weight of the generator and shaft.

JOHN BEATTY CRANE.